Aug. 10, 1948.  R. C. KEIRSEY  2,446,769
TILTING CHUTE
Filed Nov. 1, 1946  4 Sheets-Sheet 1
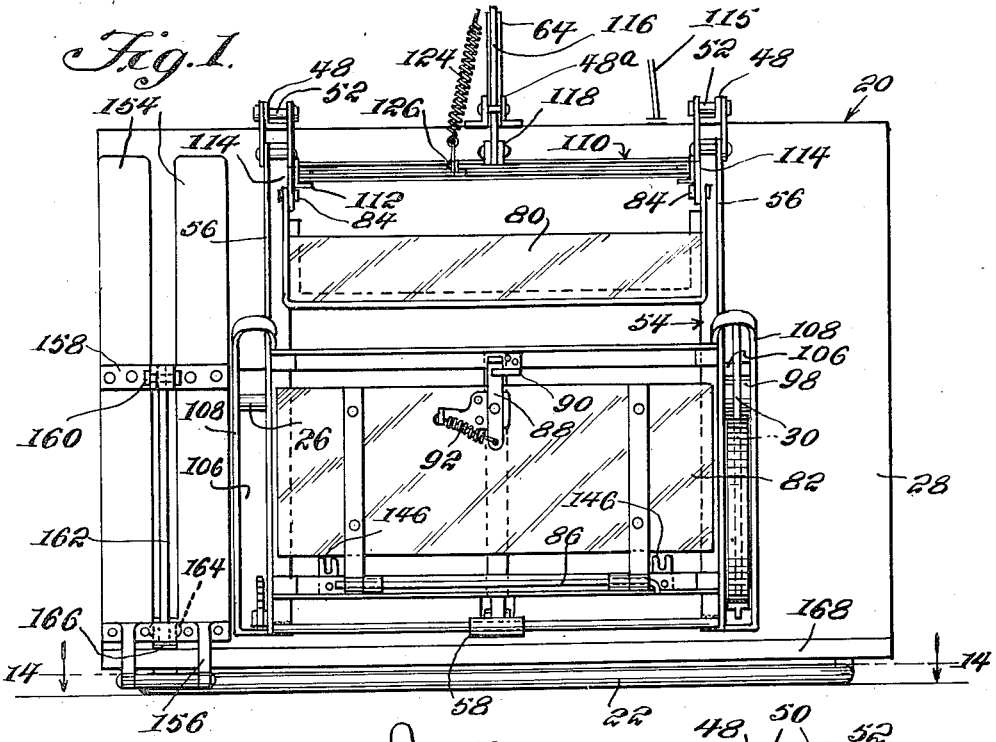
INVENTOR.
Robert C. Keirsey,
BY Victor J. Evans & Co.
ATTORNEYS Aug. 10, 1948.　　　　R. C. KEIRSEY　　　　2,446,769
TILTING CHUTE
Filed Nov. 1, 1946　　　　　　　　　　　　　　4 Sheets-Sheet 2
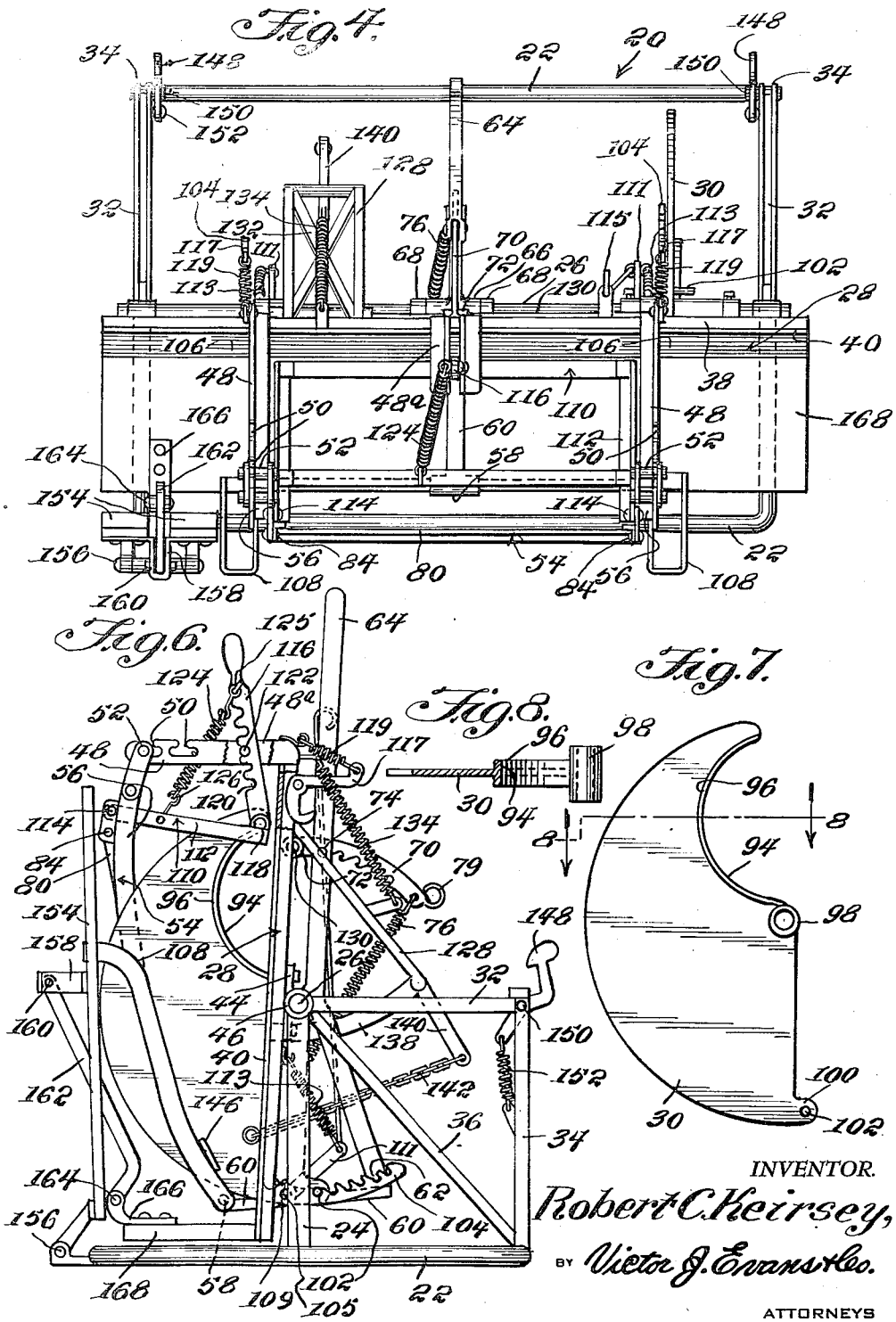
INVENTOR.
Robert C. Keirsey,
BY Victor J. Evans & Co.
ATTORNEYS Aug. 10, 1948.  R. C. KEIRSEY  2,446,769
TILTING CHUTE
Filed Nov. 1, 1946  4 Sheets-Sheet 3
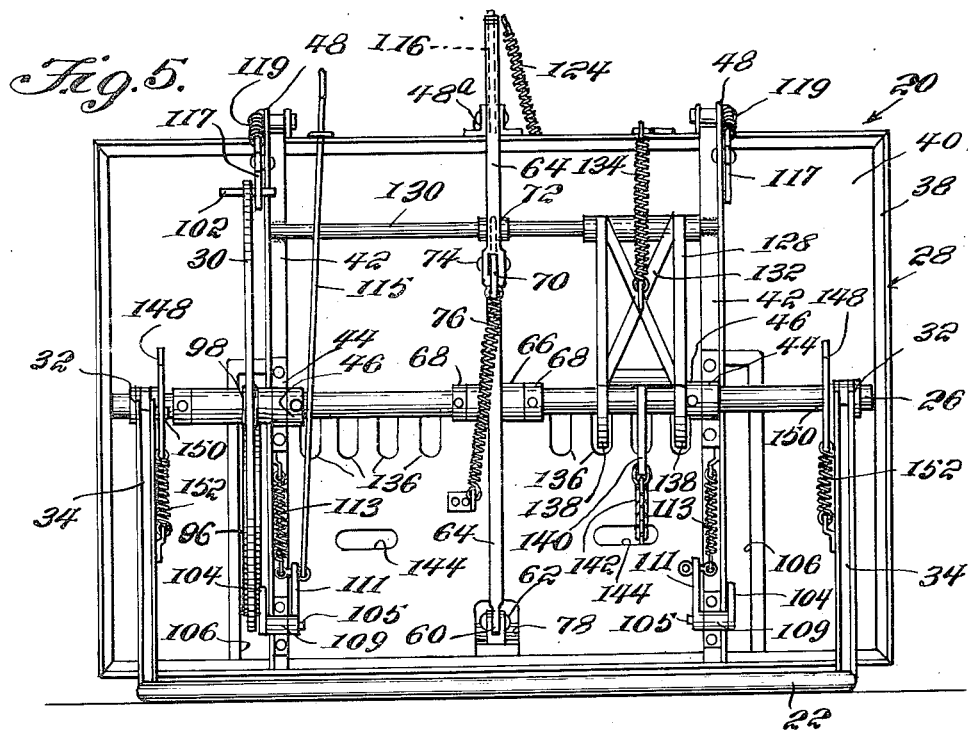
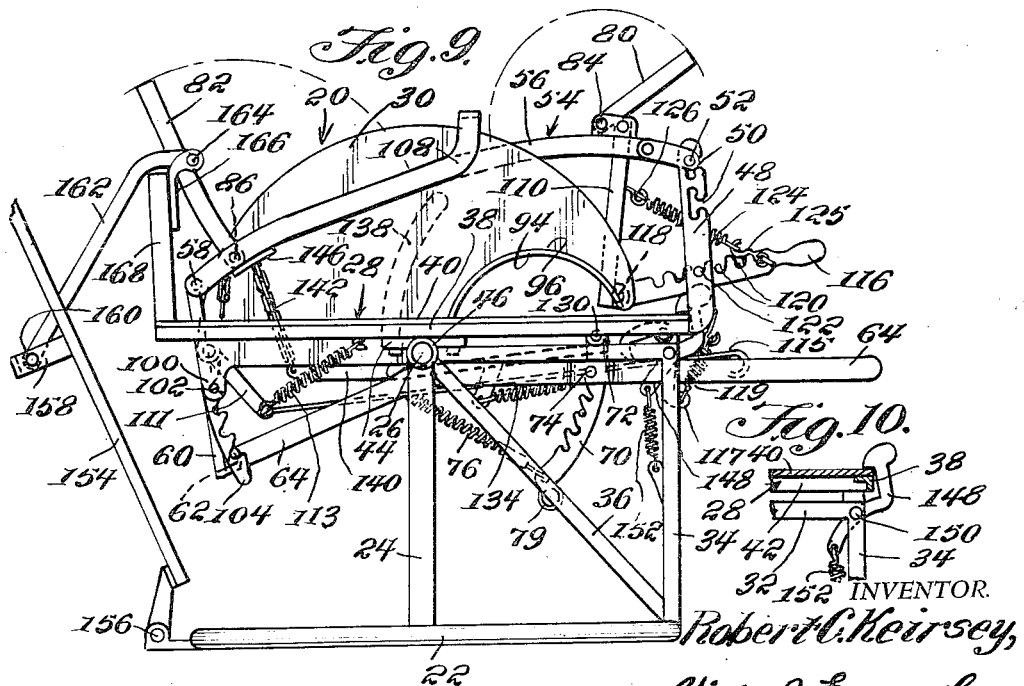
INVENTOR.
Robert C. Keirsey,
BY Victor J. Evans & Co.
ATTORNEYS

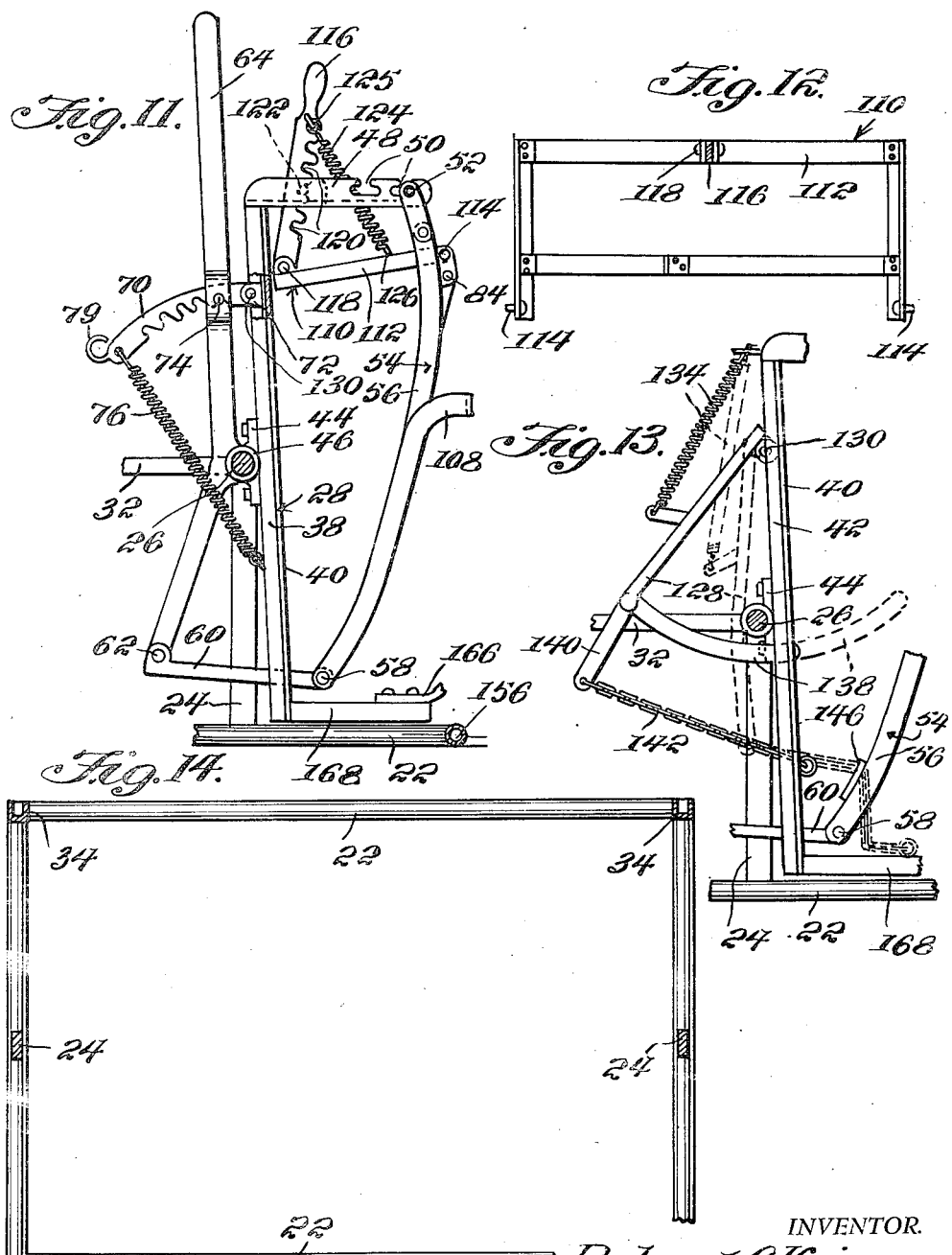

Patented Aug. 10, 1948

2,446,769

UNITED STATES PATENT OFFICE 2,446,769

TILTING CHUTE

Robert C. Keirsey, Roy, N. Mex.

Application November 1, 1946, Serial No. 707,312

4 Claims. (Cl. 119—98)

This invention relates to improvements in tilting chutes which are particularly adapted for the holding of livestock, such as calves, in a fixed position for branding, vaccinating, castrating, dehorning or other operations to be performed thereon.

A primary object of this invention is the provision of an improved chute adapted to securely retain the calf or other animal in position therein, and provided with means whereby the same may be tilted in such a manner that the animal may be positioned on its side to allow branding on the right or left of the animal with an easy quick change, thus permitting more than one operator to use the device.

An additional important object of the invention is the provision of an improved pivoted gate adapted to hold the animal's head securely in position for dehorning or the like.

A still further object of the invention is the provision of such a tilting chute, having in association therewith a leg spreader, and a holder adapted to separate the animal's rear legs and hold them fixedly in separated position without further holding on the part of the operator.

A still further object of the invention is the provision in such a device of a back rest or support, adapted to be positioned against the back of the animal, to prevent the animal from sliding too far outwardly with respect to the securing members, comprising a portion of this invention, when the chute is in tilted position.

A further important object of the invention is the provision of such a chute provided with interchangeable parts, whereby the same may be conveniently utilized to place the animal on either its right or left side as previously stated for branding or analogous operations.

A further object of the invention is the provision of such a device, which is relatively compact and small in size, whereby the same may be conveniently transported, and will prevent injury to a calf occasioned by the throwing and dragging thereof that usually accompany operations of the type performed while the animal is in the chute.

A still further object of the invention resides in the provision of such a device which will be sturdy and durable in construction, reliable and efficient in operation, since it places the calf in a clean convenient place for the operations thereof, and is relatively simple and inexpensive to manufacture and assemble.

With the above and other objects in view, the invention consists of the novel features of construction, combination and arrangement of parts more fully hereinafter described, claimed and illustrated in the accompanying drawings in which:

Figure 1 is a front elevational view of an embodiment of the invention;

Figure 2 is an elevational side view thereof;

Figure 3 is a detailed view partly in section of the squeeze side of the chute;

Figure 4 is a top plan view of the chute;

Figure 5 is a rear elevational view of the chute;

Figure 6 is an elevational view of the side opposite to that shown in Figure 2;

Figure 7 is a detailed elevational view of the pivoted neck plate;

Figure 8 is a sectional view on the line 8—8 of Figure 7;

Figure 9 is an elevational view similar to Figure 6 with the chute in tilted position;

Figure 10 is a detailed sectional view of the latch for holding the chute in the position shown in Figure 9;

Figure 11 is a detailed view of the squeeze plate and operating mechanism therefor;

Figure 12 is a plan view partly in section of the back support or rest;

Figure 13 is a detailed view of the leg spreader and operating mechanism therefor and Figure 14 is a sectional view on the line 14—14 of Figure 1.

Referring more in detail to the drawings, the reference numeral 20 generally designates the chute comprising the invention which includes a base 22 from the opposite sides of which extend a pair of uprights 24. Extending between the uprights 24 is a shaft 26 upon which is pivotally mounted a tiltable side plate or member generally indicated as 28 and a rotatable neck plate 30, both of which will be more fully described hereinafter.

Extending transversely from each of the uprights 24 is a horizontal supporting bar 32 terminating in an upright 34, the lower extremity of each being secured adjacent a corner of the base 22. Diagonally disposed reinforcing members 36 extend between the inner extremities of the bars 32 and the lower extremities of the uprights 34.

The tiltable plate 28 comprises a frame 38 adapted to be covered by a wall portion 40 which is constructed of sheet metal or the like to retain the animal in the chute.

Reinforcing bars 42 extend transversely across the member 28, and are provided with brackets 44 secured thereto, having bearing collars 46 adapted to receive the axle 26 to permit rotation of the member 28 about the axle 26 from the position shown in Figure 6 to that shown in Figure 9.

The upper portion of the member or plate 28 is provided with outwardly extending angle iron arms or members 48 to which are pivotally mounted by means of notches 50 the pivot pins 52 of the arcuate shaped squeeze side 54. The side 54 comprises the frame 56 to the lower central portion of which is pivoted at 58 an outwardly extending arm 60 which is pivoted at its opposite end at 62 to the operating lever 64, for the actuation of the squeeze side, as will be later described.

The lever 64 is provided with a bearing hub 66 for mounting the lever on the shaft 26, and set screw operated collars 68 on the shaft retain the lever in position. An arcuate shaped rack 70 is pivoted at 72 on a shaft 130 fastened to the member 28, and is adapted to engage the pin 74 on the lever 64 to retain the lever in position during operation of the squeeze member 54. A coil spring 76 connected to the rack 70 and plate 28 tensions the rack for engagement with the pin 74. The arm 60 extends through the opening 78 in the wall 40. Rack 70 is actuated by a handle 79 on the end thereof.

The side 54 is provided with doors 80 and 82, door 80 being pivoted at 84 on the frame 56 adjacent the top thereof, and the door 82 pivotally mounted by means of a rod 86 on the frame 56 adjacent the bottom thereof, and door 82 is provided with a pivoted latch 88 adapted to engage the keeper 90 on the side 54, and is spring tensioned by the spring 92 connected at one end thereof, and the latch is releasable in order to permit door 82 to be opened when desired.

The neck plate 30 is provided with a cutaway portion 94 adapted to engage the neck of a calf or similar animal, and has a flange 96 outlining the portion to prevent the animal from injury. A bearing collar 98 surrounding a suitable aperture in a central portion of the straight face of the plate 30 is adapted to mount the plate on the axle 26 for pivotal movement thereabout. The lower extremity of the member 30 terminates in an apertured lug 100 provided with a pin 102 adapted to be engaged successively in the racks 104 secured to the shafts 105 mounted in bearings 109 on the members 42, and levers 111 on the opposite end of the shafts are tensioned by springs 113 to bias the racks for engagement with the pins 102. A control rod 115 connected to the lever 111 permits pivotal movement of the arm 104 to disengage the arm from the pin 102 for movement of the plate 30, and upon making a complete half turn of the plate, the pin 102 will engage the hooked latch 117 tensioned by the spring 119 to bias the latch into engagement with the pin. Thus the plate is locked in two positions during the use of the chute.

Suitable slots 106 are provided in the member 28 in order to permit passage of the member 30 therethrough when positioned at either the right or left hand side of the chute. U-shaped elongated brackets 108 secured to the member 54 help to support the gate during the branding operation of the calf.

A back rest generally designated at 110 is also provided in order to accommodate calves or other livestock of various heights and prevent them slipping out of the device when the same is tilted. The back rest 110 takes the form of a transversely extending frame 112 pivoted at 114 adjacent the upper extremity of the member 54 and a hand lever 116 is pivoted at 118 to the central portion of the frame 112 and provided with notches 120 to engage a pin 122 on the arm 48ª. A compression spring 124 extends between the hook 125 on the upper end of the lever 116, and the hook 126 on the rest 110 thus biasing the rest toward the pin 122 to hold it in adjusted position.

Means are also provided in association with the device for separating the rear legs of the animal for doctoring and for securely holding the animal in position. Such means takes the form of a rectangular frame 128 pivotally mounted on the bar 130 secured to the reinforcing bars 42 of the member 28. The frame is strengthened by diagonal members 132 to which is secured one end of a tension spring 134, the other end being secured to the top edge of the member 28. Extending inwardly of the member 28, through parallel slots 136, and formed on the lower ends of the frame 128 are the arcuate shaped leg engaging members 138. Formed on the frame at the bottom thereof, is the depending arm 140 to which is connected the chain 142 which passing through slots 144 in the member 28 engages the keepers 146 on the member 54 below the door 82 to hold the frame 128 in adjusted relation to the animal with which it is being used.

A suitable latch member 148 for holding the device in tilted position is pivoted to the uprights 34 at 150, and the member 148 is biased by a spring 152 into latching engagement with the top rail of the member 28 when the same is in tilted position.

Parallel guide boards 154 are provided in vertical relation to the base 22, and connected thereto by the hinged U-shaped bracket 156. The guide boards 154 are provided at their medial position with a bracket 158 to which is pivotally connected, by a pin 160, an angularly shaped link 162 which is pivoted at 164 to a bracket 166 which is attached to the plate 168 which in turn is secured to the lower extremity of the member 28 and extends outwardly therefrom at right angles thereto. Thus the guide boards will be operated automatically by the lever 162 in such a way that the guide boards will be moved completely out of the way when not in use. This is especially valuable in cases where a brand is to be placed on the hip, yet upon the chute returning to normal position, the guide boards are again ready for another calf.

From the foregoing, the method of this operation, and the use of the device, should now be readily understandable. When it is desired to operate on a calf or other animal, the same is driven between the side plate 28 and the squeeze side 54 until its neck passes within the arcuate interior surface of the gate 30 which gate is then swung about the axle 26 until the animal's neck is held firmly against the side plate member 28. The device is then latched in position by pins 102 engaging with one of the notches in the racks 104. The squeeze side 54 is then rotated about the axle 26 until the body of the animal is firmly clamped between the sides of the device, the latching members 148 engaging the member 28, and the back rest 110 is suitably adjusted, until the same seats firmly against the back of the animal. The leg separating member 128 is then biased from the position shown in full lines in Figure 13 to that shown in dotted lines, whereupon the arms or projections 138 serve to separate the legs of the animal, and hold them in separated position.

Thus it will be seen that the animal is firmly held in the device in such manner as to be incapable of movement in any direction. The device is then tilted to the position shown in Figure 9, and the upper transverse member of the frame 38 of the side plate 28 is engaged by the latch 148, thus tilting the animal to its side and making all parts of the body thereof readily available for operation as described. The head of the calf is in convenient position for dehorning, or the like, and the body portion of the calf may be readily reached by opening the gates or doors 40 for branding or other operations.

Obviously, the device may be utilized for operation on either the right or left-hand side of the calf or similar animal by merely changing the position of the gate member 30 to the opposite end of the device, and correspondingly reversing the position of the leg separating member 128.

Equally obviously, the device may be made in any desired size to accommodate any desired size of animal, and of any suitable material.

From the foregoing, it will now be seen that there is herein provided an improved tilting chute, adapted to securely hold a calf or other animal during the performance of an operation, of any desired sort, which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

Having thus described the invention, what is claimed as new and desired to be secured by Letters Patent is:

1. A device of the character described, comprising a frame, an axle mounted in said frame, a side member mounted on said axle for rotation thereabout, a side squeeze member pivotally secured to the upper edge of said side member, a semi-circular gate mounted on said axle and swingable thereabout to engage the neck of an animal, said gate having an arcuate outer edge, and formed with arcuate shaped side flanges outlying an arcuate neck engaging aperture therein, and leg spreading members pivotally secured to said side member for spreading the legs of an animal retained in said frame by said side squeeze member.

2. The invention as in claim 1 wherein said side member is provided with a right angularly extending plate at the lower edge thereof, means is secured to said side squeeze member for swinging said side member to tilted position, and a latch means is mounted on said frame for retaining said side member in tilted position.

3. The invention as in claim 1 wherein a back rest is adjustably mounted on the upper end of said side member, and has pivotal connection with the upper edge of said squeeze member.

4. The invention as in claim 1 wherein U-shaped brackets are secured to said squeeze member at the vertical ends thereof to support said gate during the handling of the animal.

ROBERT C. KEIRSEY.

REFERENCES CITED

The following references are of record in the file of this patent:

UNITED STATES PATENTS

| Number | Name | Date |
|---|---|---|
| 2,126,593 | Walsh | Aug. 9, 1938 |